United States Patent [19]

Uchiyama

[11] Patent Number: 4,895,647
[45] Date of Patent: Jan. 23, 1990

[54] FILTERING APPARATUS

[76] Inventor: Tadao Uchiyama, 5-24-3 Matsugaoka, Funabashi-shi, Chiba-ken, Japan

[21] Appl. No.: 226,845

[22] Filed: Aug. 1, 1988

[30] Foreign Application Priority Data

Aug. 12, 1987 [JP] Japan ............................... 62-201154
Nov. 25, 1987 [JP] Japan ............................... 62-296896

[51] Int. Cl.$^4$ ..................... E03B 11/00; B01D 35/06
[52] U.S. Cl. .................................. 210/171; 210/222; 210/223; 210/402; 210/408; 209/223.1; 209/229
[58] Field of Search ............... 210/391, 393, 407, 408, 210/409, 410, 402, 784, 171, 172, 222, 223; 198/803.6; 209/39, 40, 223.1, 229

[56] References Cited

U.S. PATENT DOCUMENTS

| | | | |
|---|---|---|---|
| 1,195,000 | 8/1916 | Guijarro | 210/402 |
| 1,630,274 | 5/1927 | North | 210/403 |
| 1,748,151 | 2/1930 | Stehling | 210/402 |
| 1,856,452 | 5/1932 | Armstrong | 210/391 |
| 2,014,144 | 9/1935 | Mensing | 210/403 |
| 2,267,086 | 12/1941 | Donohue | 210/748 |
| 2,877,901 | 3/1959 | Maus | 210/391 |
| 3,979,289 | 9/1976 | Bykowski | 210/403 |
| 4,498,987 | 2/1985 | Inaba | 210/223 |
| 4,518,496 | 5/1985 | Kanekubo | 210/222 |

FOREIGN PATENT DOCUMENTS 2124510A 2/1984 United Kingdom ............... 210/403

Primary Examiner—W. Gary Jones
Assistant Examiner—Matthew O. Savage
Attorney, Agent, or Firm—Wenderoth, Lind & Ponack

[57] ABSTRACT

A filtering apparatus filters cutting oil containing metal chips so that the filtered cutting oil can be recycled. The filtering apparatus includes a reservoir, a filtering drum journalled within the reservoir and having a filtering screen extending about the periphery of the drum, chip discharge device for carrying separated metal chips of the reservoir, a discharged chip receiving bin disposed outside of the reservoir adjacent to the discharge end of the chip discharge device and a filtered oil receiving bin disposed outside of the reservoir adjacent to a filtered oil discharge area of the reservoir. A permanent magnet is disposed outside the reservoir so as to attract metal chips to the bottom of the reservoir from where the chips are discharged by the chip discharge device.

7 Claims, 2 Drawing Sheets

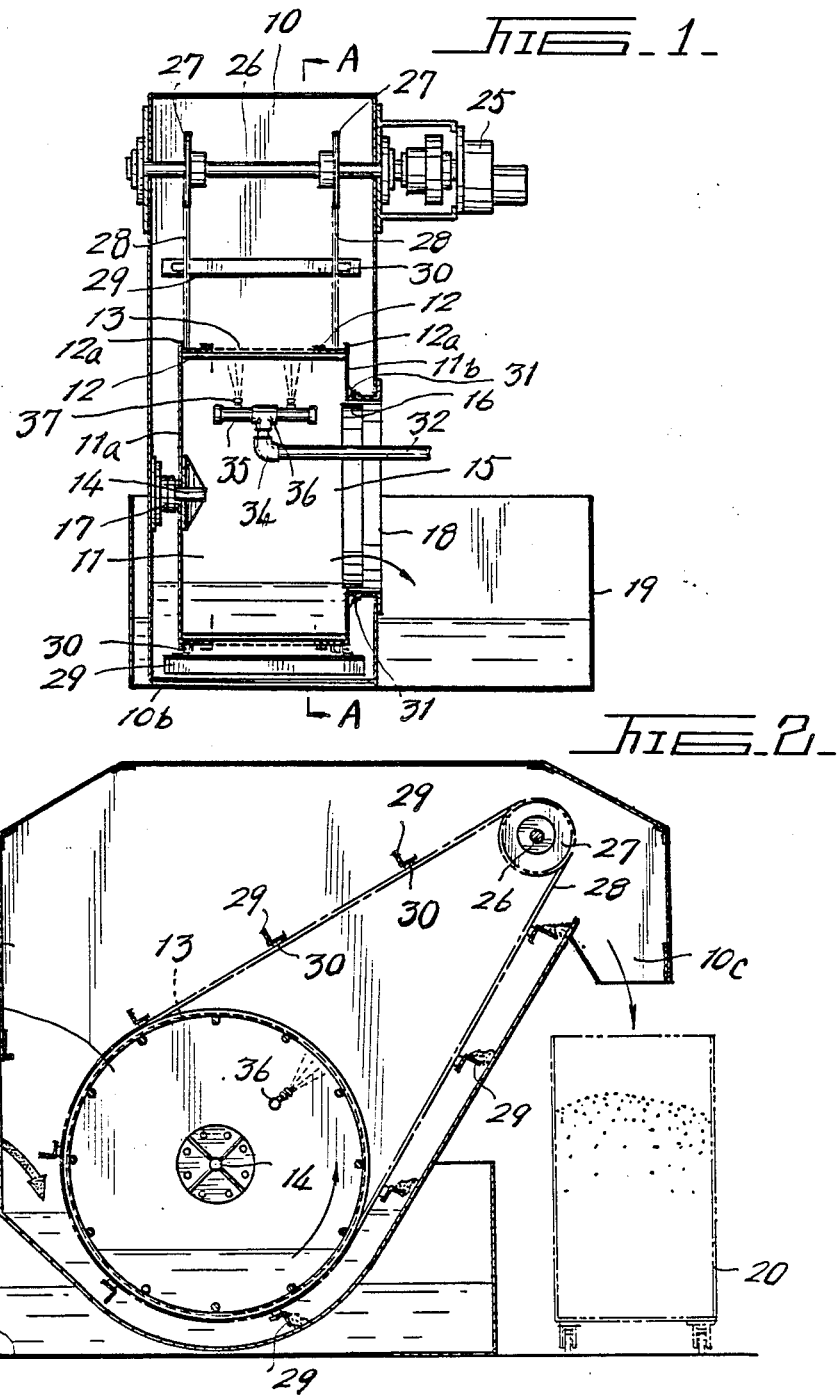

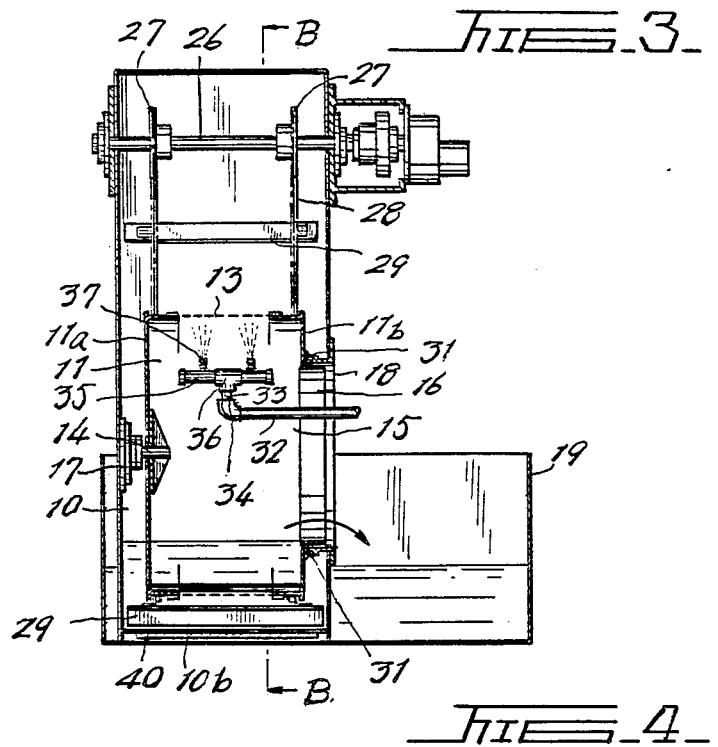
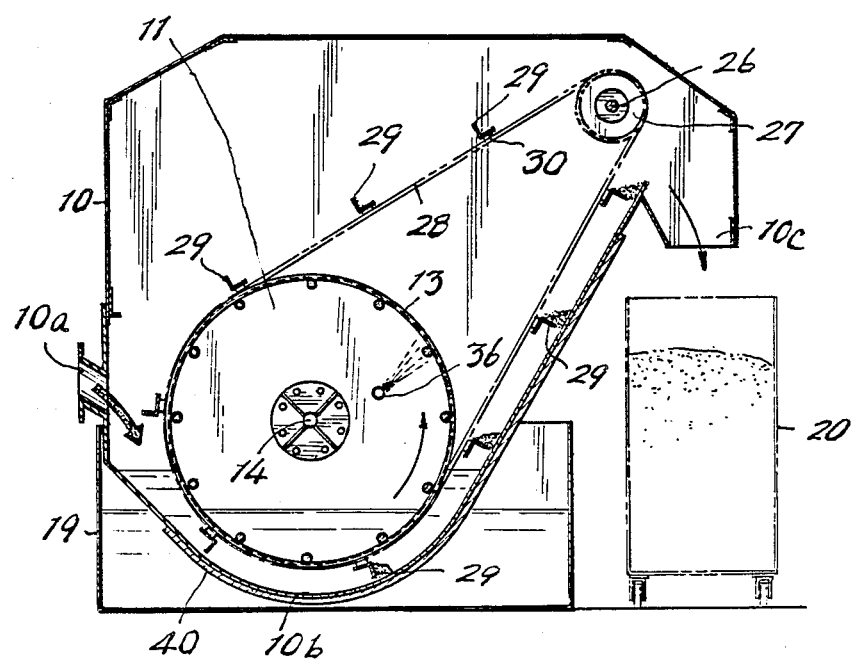

FILTERING APPARATUS

BACKGROUND OF THE INVENTION

This invention relates to a filtering apparatus for filtering cutting oil containing metal pieces which are referred to as "metal chips" produced during metal cutting operations in a metal working machine.

There have been proposed and practically employed a variety of apparatus for filtering cutting oil containing metal chips, and one type of the prior art filtering apparatus is disclosed in U.S. Pat. Nos. 1,630,274, 2,014,144 and 3,979,289, for example. As shown in these U.S. patents, a filtering drum having a filtering screen extending about the periphery thereof is rotatably mounted within a cutting oil reservoir and during operation, cutting oil containing metal chips therein is introduced into the filtering drum which separates the oil and chips from each other and the separated metal chips are allowed to settle within the filtering drum to be carried out of the drum whereas the filtered cutting oil is allowed to flow from the drum into the reservoir.

However, the above-mentioned filtering appartus has the following drawbacks:

In the prior art filtering apparatus, since cutting oil containing metal chips is introduced into the filtering drum, the total weight of the chips and oil is directly applied to the filtering drum. As a result, a specific mechanism for journalling the filtering drum within the oil reservoir has to be provided. In addition, the filtering screen extending about the periphery of the filtering drum should be designed to withstand potential damage from the metal chips contained in the cutting oil.

Furthermore, means for depositing the metal chips separated from the cutting oil within the filtering drum and means for carrying the deposited metal chips out of the filtering drum should be specially designed.

SUMMARY OF THE INVENTION

Thus, the present invention has as its object to provide a filtering apparatus of the above-described type which eliminates the above-mentioned drawbacks inherent in the prior art filtering apparatus referred to hereinabove. According to the present invention, the load to be applied to the bearing journalling the filtering drum within the cutting oil reservoir is comparatively small so that the filtering drum can rotate smoothly, potential damage and/or clogging of the filtering screen as a result of the introduction of cutting oil containing metal chips into the filtering drum can be prevented and the separation of the metal chips from the cutting oil and the discharge of the separated chips from the reservoir can be simply and easily performed.

The above and other objects and attendant advantages of the present invention will be more apparent to those skilled in the art from a reading of the following detailed description in conjunction with the accompanying drawings which show perferred embodiments of the invention for illustrative purposes only, but not for limiting the scope of the same in any way.

BRIEF DESCRIPTION OF THE DRAWINGS

FIG. 1 is a vertical sectional view of a first preferred embodiment of the filtering apparatus in accordance with the present invention;

FIG. 2 is a sectional view taken substantially along the line A—A of FIG. 1;

FIG. 3 is a vertical sectional view of a second preferred embodiment of the filtering apparatus in accordance with the present invention and;

FIG. 4 is a sectional view taken substantially along the line B—B of FIG. 3.

PREFERRED EMBODIMENTS OF THE INVENTION

The present invention will be now described referring to the accompanying drawings and more particularly to FIGS. 1 and 2 in which the first preferred embodiment of the filtering apparatus of the invention is illustrated. In the drawings, reference numeral 10 denotes a rectangular cutting oil reservoir which has an inlet 10a in one end wall through which cutting oil containing metal chips is introduced into the reservoir 10, a upwardly extending arcuate bottom 10b and a metal chip discharge area or opening 10c in the opposing end wall through which the metal chips separated from the cutting oil are discharged from the apparatus. A filtering drum 11 is rotatably supported, with a portion thereof immersed in the cutting oil within the reservoir, 10 to be rotated by drive means as will be described hereinafter.

The filtering drum 11 rotatably supported in the reservoir 10 has side plates 11a, 11b on the opposite sides of the filtering drum 11, opposing and spaced screen holding-down means 12, 12 provided on the periphery of the filtering drum 11 and each having a radially outwardly extending flange 12a, and a filtering screen 13 extending about the periphery of the filtering drum 11 under tension and held by the holding-down means 12, 12.

A bar-shaped rotary shaft 14 is journalled at the center of the side plate 11a for rotatably supporting the filtering drum 11 and the other side plate 11b is formed at the central area thereof with a circular opening 15 in which an annular rotary member 16 is disposed. The annular rotary member 16 is secured to the filtering drum 11 for rotation therewith.

The side bar-shaped rotary shaft 14 is journalled in a bearing 17 disposed in the side wall of the reservoir 10 where the shaft 14 extends whereas the annular rotary member 16 is journalled in an annular bearing 18 provided in the opposite side wall of the reservoir 10 whereby the filtering drum 11 is supported within the reservoir in a floating condition.

A filtered oil receiving bin 19 is disposed outside of the reservoir 10 adjacent to the side wall of the reservoir 10 where the bearing 18 is provided so that the filtered oil from the reservoir 10 flows into the bin 19. A pump (not shown) always pumps the filtered cutting oil from the oil bin 19 to a suitable external system (not shown) for reuse.

A chip receiving bin 20 is disposed outside of the reservoir 10 adjacent to the end wall of the reservoir 10 in which the opening 10c is provided; and the bin 20 is positioned below the opening 10c.

The drive means for rotating the filtering drum 11 comprises a motor 25 provided at an upper portion on the outer surface of the side wall of the reservoir 10 where the annular bearing 18 is provided, a transverse shaft 26 extending across the reservoir 10 and operatively connected to the output shaft of the motor 25, a pair of laterally spaced sprockets or pulleys 27, 27 mounted on the transverse shaft 26 and endless chains or belts 28, 28 trained about the sprockets or pulleys and the filtering drum 11. A plurality of transverse scrapers 29, 29,... extend between and are secured (at their opposite ends) to the chains or belts 28 by securing means 30. The chains or belts 28, the scrapers 29 and the arcuate bottom 10b of the reservoir 10 form the chip conveying path.

An annular packing 31 is disposed between the outer surfaces of the side plate 11b and of the bearing 18 to prevent the filtered cutting oil from flowing from the side plate 11b into the reservoir 10 or the cutting oil containing chips therein introduced into the reservoir from flowing from the side plate 11b into the filtering drum 11.

An air spray means extends from outside of the reservoir 10 through the opening 15 into the filtering drum 11 and includes a horizontal tube portion 32, an upright tube portion 33 connected to the tube portion 32 by an elbow joint 34, a horizontal tube portion 35 connected to the upright tube portion 33 by a joint 36 and nozzles 37 through which air under pressure is sprayed against the inner surface of the filtering screen 13 to dislodge any chips which have been deposited on the screen. The outer end of the air spray means is connected to an external air supply source (not shown).

During operation, cutting oil containing metal chips is introduced into the reservoir 10 through the inlet 10a and the drive means is operated to impart a driving force through the shaft 26, the sprockets 27 and the chains 28 to the filtering drum 11 to rotate the drum. Simultaneously, the pump (not shown) is also turned on to pump the filtered cutting oil from the oil bin.

Thus, the filtering drum 11 within the reservoir 10 rotates with a portion of the drum and more particularly, a portion of the filtering screen 13 thereon immersed in the cutting oil containing metal chips in the reservoir 10 to separate the oil and chips from each other. The cutting oil having metal chips removed therefrom flows into the filtering drum through the filtering screen 13 as the filtered cutting oil. Since the filtering drum 11 is rotating, the possibility of the clogging of the filtering screen 13 with the separated metal chips can be minimized. However, if and when the screen 13 is clogged with the metal chips, the air spray means is turned on to spray air under pressure against the inner surface of the filtering screen 13 to dislodge the metal chips from the screen. After the separation of the metal chips, the filtered oil flows through the opening 15 along the rotary annular member 16 and the bearing 18 into the bin 19. The filtered oil in the bin 19 is pumped out of the bin by the pump (not shown) to the external system for reuse. On the other hand, the metal chips separated from the cutting oil settle on the bottom 10b of the reservoir 10 where the scrapers 29 on the rotating chains 28 scrape the metal chips and entrain the chips thereon so as to carry the chips out of the reservoir through the opening 10c into the bin 20.

Since the filtering apparatus of the present invention has the structure and operates as described hereinabove, the present invention can eliminte possible damage and/or clogging of the filtering screen as a result of the introduction of cutting oil containing metal chips into the filtering drum as experienced with the prior art filtering apparatus employing the filtering drum. Further, according to the present invention, any specific mechanism for transferring chips from the filtering drum onto the scrapers and for alleviating a load applied to the filtering drum when cutting oil containing metal chips is introduced into the filtering drum is not required. Rather, since the introduction of metal chips into the filtering drum in principle causes the filtering drum to float in the reservoir, the load applied to the bearing supporting the rotary shaft of the filtering drum is reduced and as a result, the filtering drum can rotate smoothly.

FIGS. 3 and 4 show the second embodiment of the filtering apparatus of the present invention. The second embodiment is substantially identical to the first embodiment except for the provision of a permanent magnet on the undersurface of the bottom of the reservoir. Thus, the components of the second embodiment corresponding to those of the first embodiment are designated with the same reference numerals and the description of the corresponding components will be omitted here. The permanent magnet 40 extends a substantial distance along the undersurface of the upwardly extending arcuate bottom 10b of the reservoir so that the magnet positively attracts the metal chips separated from the cutting oil to the reservoir bottom whereby the scrapers 29 can easily scrape up and convey the metal chips.

While the present invention has been particularly shown and described with reference to the preferred embodiments thereof, it will be understood by those skilled in the art that various changes in form and details may be made therein without departing from the spirit and scope of the invention.

What is claimed is:

1. A filtering apparatus for filtering cutting oil containing metal chips, said apparatus comprising:
   an oil reservoir having a rectangular cross section, opposed end walls one of which end walls defines an oil inlet through which cutting oil is introduced into the reservoir and the other of which end walls defines a chip discharge area at which area metal chips are discharged out of the reservoir, opposed side walls extending between said end walls and one of which side walls has an oil discharge opening extending therethrough, and a bottom defined by an arcuate bottom wall extending between said end walls;
   a permanent magnet disposed outside said reservoir on said bottom wall for attracting metal chips in cutting oil in said reservoir toward the bottom wall thereof;
   a filtering drum rotatably mounted within said reservoir, said drum having a filtering screen extending about the periphery thereof for filtering cutting oil containing metal chips;
   an annular rotary member secured to said drum so as to rotate therewith and journalled in said oil discharge opening extending through said one of the side walls;
   a rotary shaft journalled in the other of said side walls and rotatably supporting said drum; and
   chip discharge means disposed in said reservoir for discharging metal chips disposed at said bottom of said reservoir from said reservoir at said discharge area, said chip discharge means operatively connected to said drum so as to rotate said drum when said chip discharge means operates.

2. A filtering apparatus as claimed in claim 1, and further comprising a filtered oil receiving bin disposed outside of said reservoir in communication with said oil discharge opening for receiving filtered oil from said reservoir, and a metal chip receiving bin disposed outside of said reservoir below said chip discharge area for receiving chips discharged from said reservoir by said chip discharge means.

3. A filtering apparatus as claimed in claim 2, wherein said filtering drum comprises filtering screen hold-down means disposed about the periphery of the drum adjacent the opposite sides thereof for fixing said filtering screen to and against the drum, and side plates at the opposite sides of the drum, one of said side plates having an opening therein in which opening said annular rotary member is secured to said drum, and further comprising an annular bearing disposed in the opening extending through said one of said side walls, said annular rotary member being rotatably supported in said annular bearing.

4. A filtering apparatus as claimed in claim 3, and further comprising an annular packing extending around said annular bearing and forming a seal between said annular bearing and said one of said side walls of said drum.

5. A filtering apparatus as claimed in claim 3, wherein each of said filtering screen hold-down means comprises a flange extending radially outward of the drum.

6. A filtering apparatus as claimed in claim 2, wherein said chip discharge means includes a motor having an output shaft disposed on the outer surface of said reservoir, a transverse rotary shaft extending across said reservoir and operatively connected to the output shaft of said motor, a pair of parallel and spaced-apart sprockets mounted on said transverse shaft, and endless chains trained about said sprockets and said filtering drum.

7. A filtering apparatus as claimed in claim 6, wherein said chip discharge means further includes a plurality of transverse scrapers spanning said chains and having opposite ends secured to said chains, said sprockets and said filtering drum so positioned in the apparatus as to guide said chains and scrapers along a path extending from the bottom of said reservoir to said chip discharge area.

* * * * *

UNITED STATES PATENT AND TRADEMARK OFFICE
CERTIFICATE OF CORRECTION

PATENT NO. : 4,895,647

DATED : January 23, 1990

INVENTOR(S) : Uchiyama

It is certified that error appears in the above-identified patent and that said Letters Patent is hereby corrected as shown below:

Title page, after item [76] the following should be inserted

-- [73] Assignee: Syst Corporation
                              Tokyo, Japan --

Signed and Sealed this

Eleventh Day of June, 1991

*Attest:*

HARRY F. MANBECK, JR.

*Attesting Officer*        *Commissioner of Patents and Trademarks*